March 26, 1935.  A. SUSSMAN  1,995,591
GAS SAVING PLATE
Filed Dec. 24, 1932
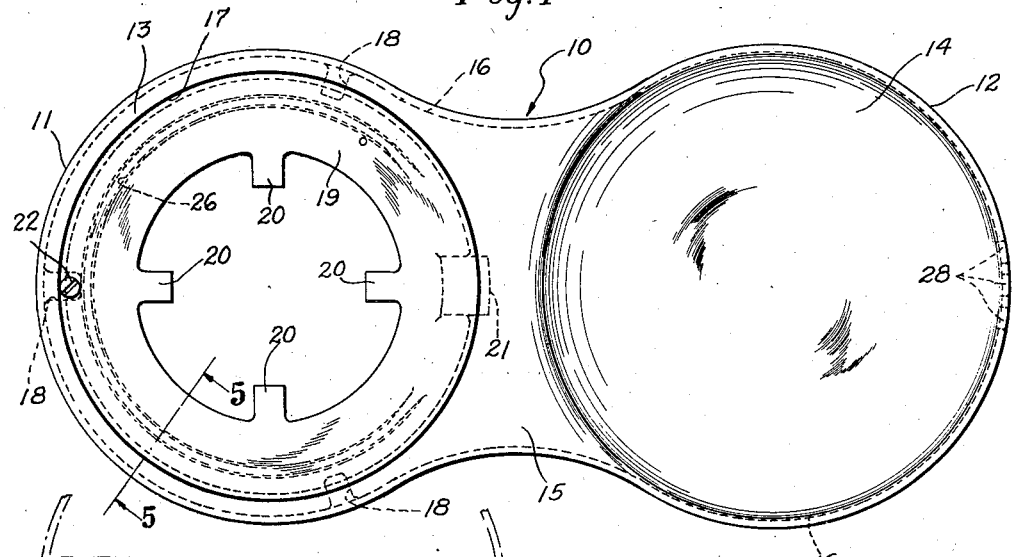
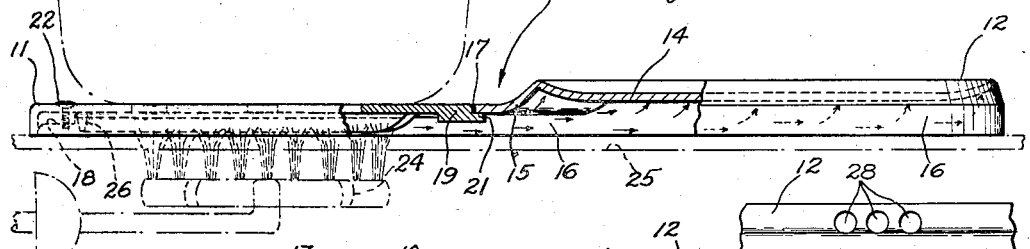
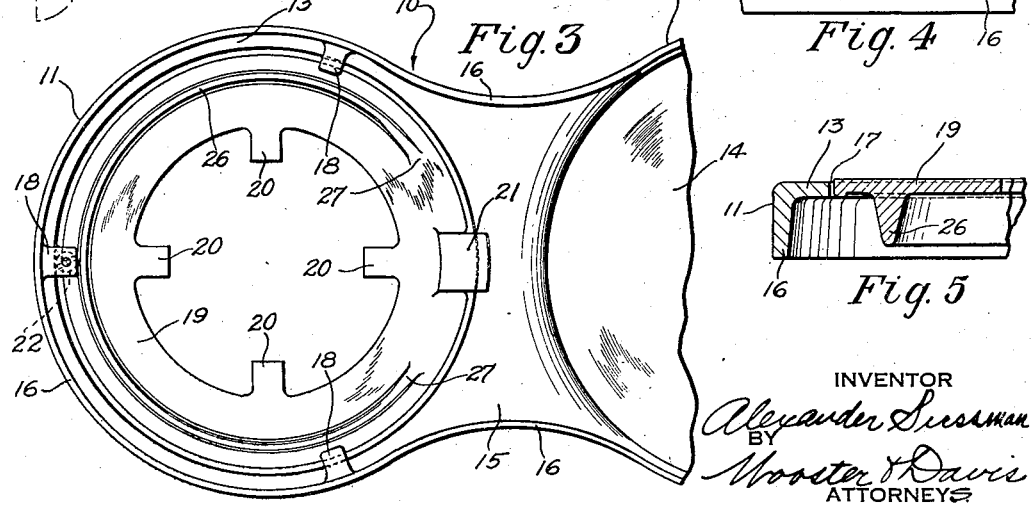
INVENTOR
Alexander Sussman
BY
Wooster & Davis
ATTORNEYS Patented Mar. 26, 1935

1,995,591

UNITED STATES PATENT OFFICE 1,995,591

GAS SAVING PLATE

Alexander Sussman, New Milford, Conn.

Application December 24, 1932, Serial No. 648,748

5 Claims. (Cl. 126—216)

This invention relates to new and useful improvements in heating apparatus as applied to cooking and has particular relation to a double heating plate attachment for gas stoves.

An object of the invention is to provide a gas stove attachment or plate including a pair of portions one of which is to be placed over a burner and the other of which includes a finished upper surface providing a cooking utensil, the said other portion being arranged to have the heated products of combustion from the flame under the first portion pass through it whereby it will be heated.

Another object is to provide a gas stove attachment comprising an elongated body one end portion of which is open at its top and bottom sides and the other end portion of which is closed at its top side and has one or more openings in its end wall whereby products of combustion from a burner under the first end portion will pass through the second end portion and heat it.

A further object is to provide a gas stove attachment or plate comprising an elongated body one end portion of which is open at its top and bottom sides and the other end portion of which is closed at its top side, the said second end portion having its upper surface in a plane above that of the first end portion, a depending flange extending entirely about said plate, and said flange having an opening in its end at said second portion whereby products of combustion from a burner under the first end portion will pass through the second end portion to heat the same.

Another object is to provide a gas stove attachment comprising an elongated aluminum body providing a pair of end portions of which one is opened at its upper side and adapted to be placed directly over a flame, the body being constructed to have the hot gases and products of combustion from the burner under the one end portion thereof pass over to heat the other end portion thereof, the said body in its other end portion including an externally smooth or polished upper wall providing a surface for frying, broiling or the like.

An additional object is to provide a gas stove attachment comprising an elongated aluminum body providing a pair of end portions of which one is open at its upper side and adapted to be placed directly over a flame, the body being constructed to have the hot gases and products of combustion from the burner under the first end portion pass over to heat the other end portion, an insert of cast iron or the like being arranged in the open upper side of the first end portion of the body in position to support a cooking utensil and to be directly engaged by the flame of a burner whereby to protect the body, and said body in its second end portion including an externally smooth or polished upper wall providing a cooking utensil.

Other objects and advantages will become apparent from a consideration of the following detailed description taken in connection with the accompanying drawing wherein a satisfactory embodiment of the invention is shown. However, it will be understood that the invention is not limited to the details disclosed but includes all such variations and modifications as fall within the spirit of the invention and the scope of the appended claims.

In the drawing:

Fig. 1 is a top plan view showing my improved double heating plate for gas stoves;

Fig. 2 is a view partly in side elevation and partly in section, showing the improved plate in use;

Fig. 3 is a bottom plan view of a portion of the plate;

Fig. 4 is an end elevational view of a portion of the plate showing the draft openings in one end wall thereof; and Fig. 5 is a detail sectional view taken substantially along the line 5—5 of Fig. 1.

Referring in detail to the drawing, my improved double heating plate includes an elongated body 10 comprising an aluminum casting including an end portion 11 and an end portion 12. These end portions include top wall portions 13 and 14 respectively, the said top wall portions being connected by an intermediate top wall portion 15 the said top wall portions together forming the top wall of the body. The body 10 includes a continuous depending flange 16 forming side and end walls therefor and said flange has its entire lower edge in substantially the same plane whereby it constitutes a support to rest on the upper surface of a stove and firmly support the plate or body in a horizontal position.

As is clear from the drawing, the end portion 11 of the body includes but a small portion of upper or top wall 13 the said end portion having a relatively large opening 17 through its top wall. The body includes spaced lugs 18 projecting into this opening in a plane immediately below the top wall 13 of said end portion and disposed on these lugs is a cast iron or cast steel or the like ring 19 which while disclosed as annular may be of any desired shape as square or the like. The said ring is preferably centrally open and may include inwardly projecting lugs 20 flush with its upper surface and when the ring is supported on the lugs 18 the upper surface of the ring is substantially in the plane of the upper surface of top wall portion 13.

The ring 19 includes a radially extending lug 21 projecting from the underside of the ring and this lug is arranged to engage the under surface of the top wall portion 15 as clearly shown in Fig. 2. Extending through the ring is a screw 22 which may be threaded into one of the lugs 18, preferably a lug diametrically opposite the lug 21 whereby as the screw is tightened there will be a tendency to rock or fulcrum the ring, on the others of the lugs 18, to have the lug 21 carried by the ring forcefully engage the under surface of top wall portion 15. In this way, the ring will be firmly held in place.

It will be apparent from the drawing that ring 19 is adapted when the device is in use to support a cooking utensil as suggested by the broken line at 23 in Fig. 2. This figure suggests a gas burner at 24 and an upper portion 25 of a stove and it will be noted that the body 10 is arranged on the stove with its end portion 11 disposed over the burner 24. With this arrangement it will be apparent that the aluminum casting comprising the body portion 10 is so arranged as not to be directly engaged by the flame from the burner 24 whereby it will not be likely to warp. Further, it is to be understood that the ring 19 need not necessarily be of cast iron but may be of any other suitable material and wherever in the appended claims the ring is referred to as a cast iron or an iron ring it is intended that such statement should also cover cast steel, wrought iron or any other material suited to the purpose. The ring, however, is not necessarily iron, altho that is the preferred construction, as it may be of aluminum, or any other suitable material.

It will be noted that the improved plate is in Fig. 2 arranged in a horizontal position being supported as by the upper portion 25 of a gas stove. On its under side near its outer edges the ring 19 includes a depending flange 26 extending substantially about the ring but open on its side toward the end portion 12 as shown at 27 particularly in Fig. 3. When the device is in use, the utensil 23 will in some instances completely close the opening through the ring 19 and will in all cases substantially close such opening. The hot gases and the products of combustion from the burner 24 are prevented from escaping upwardly and by means of the flange 26 of the ring are prevented from directly engaging the depending flange 16 of the body 10.

These hot gases and products of combustion pass under the top wall portion 15 of the body and between the side wall portions formed by the flange 16 and from the end portion 11 to the end portion 12 as suggested by the small arrows in Fig. 2. The upper or top wall 14 of the end portion 12 is somewhat dished so that its central portion is lower than its edge portions. Therefore, the central portion acts somewhat as a baffle to a portion of the incoming gases causing them to spread laterally so that the hot gases are distributed in the end portion 12 with the result that its top wall will be uniformly or substantially uniformly heated. To assist the circulation from the end portion 11 to the end portion 12 the flange 16 where it forms the extreme end wall of portion 12 is provided with an opening or with a plurality of openings 28 whereby heated gases and products of combustion passing from the end portion 11 to the end portion 12 may escape at the extreme end of said portion 12. These openings tend to establish a draft and thus increase the circulation.

The top wall portion 14 is an integral part of the casting comprising the body 10 and if desired, the entire outer surface of said casting may be polished. However, this top wall 14 is designed to form a griddle or the like and to be used directly as a cooking utensil. Therefore, it is finished and polished and may be used for frying, broiling, baking or the like. Of course, if desired, a further cooking utensil as a coffee pot or the like might be supported on the wall 14. However, this wall is concave or dished so that grease, batter or the like will be prevented from running off as when frying eggs, griddle cakes, or the like. The end portion 12 heats up very rapidly and the top wall 14 of said portion may be used for frying eggs or the like while coffee is being made over the end portion 11, the device being particularly adapted for use with a stove having but a single burner.

The device is of attractive appearance being of heavy cast aluminum and being preferably finished on all its exterior surfaces and it may be easily positioned and supported for use and easily removed after use. Further, it may be easily cleaned and kept in attractive condition. It should be noted that the top or upper wall 14 of end portion 12 is arranged in a plane above the top wall of the end portion 11 whereby the passage of heated gases and products of combustion from the portion 11 to the portion 12 is further facilitated owing to the natural tendency of the heated gases to move upwardly. This elevation of the top wall of the end portion 12 together with the discharge or outlet openings 28 provides for an increased circulation of hot gases through the end portion 12 whereby its upper or top wall is quickly heated and made ready for use.

Having thus set forth the nature of my invention, what I claim is:

1. A double heating plate for gas stoves comprising an elongated body of aluminum including a top wall and a continuous depending flange extending from the edges of said top wall and providing side and end walls, said body having first and second end portions of which the first end portion is to be disposed over a burner, said first end portion having a large opening through its top wall, an iron ring in said opening and supported by said end portion, said ring adapted to support a cooking utensil and to protect said aluminum body from the flame of a burner, said side and top walls of the body providing a passage whereby the products of combustion from a burner under the first end portion of the body may pass to and through the second end portion and under the top wall thereof to heat it, and said top wall of the second end portion of the body being dished and imperforate to provide a cooking utensil.

2. In a double heating plate for gas stoves comprising an elongated body of aluminum including a top wall and a continuous depending flange extending from the edges of said top wall and providing side and end walls, said body having first and second end portions of which the first end portion is to be disposed over a burner, said first end portion having a large opening through its top wall, an iron ring in said opening and supported by said end portion, said ring adapted to support a cooking utensil and protect said aluminum body from the flame of a burner, said top and side wall of the body providing a passage whereby the products of combustion from a burner under the first end portion of the body may pass to and through the second end portion and under the top wall thereof to heat it, and said ring including a depending flange to protect the side and end walls of said first end portion of the body from the flame of the burner and said flange open at its side toward said second end portion of the body to permit of the passage of heated gases and products of combustion from the first to the second end portion of the body.

3. A double heating plate for gas stoves comprising an elongated body of aluminum including a top wall and a continuous depending flange extending from the edges of said top wall and providing side and end walls, said body having first and second end portions of which the first end portion is to be disposed over a burner, said first end portion having a large opening through its top wall, spaced supporting lugs carried by said body and projecting into said opening, an iron ring on said lugs, said ring having a lug entering under the top wall of the body, means connecting said ring with one of the body carried lugs to secure the ring in place with the ring clamped against the body carried lugs and with the ring carried lug engaging the under surface of the top wall of the body and with the upper surface of the ring substantially in the plane of the upper surface of the top wall of said first end portion of the body, said ring adapted to support a cooking utensil and protect said body from a flame of a burner, and said top wall of the second end portion of the body being dished and imperforate to provide a cooking utensil.

4. In a double heating plate for gas stoves comprising an elongated body having a top wall and a continuous depending flange extending from the edge portions of said top wall and providing side and end walls, said body having first and second end portions of which the second end portion is to be disposed over a burner, said side and top walls of the body providing a passage between said end portions, said side wall in the part thereof opposite the second end portion of the plate having an exit opening therethrough whereby the products of combustion from a burner under the second end portion must pass through the first end portion and entirely across the under surface of the top wall thereof to reach said exit opening, and said top wall of the first end portion being imperforate to provide a cooking utensil.

5. In a double heating plate for gas stoves comprising an elongated body having a top wall and a continuous depending flange extending from the edge portions of said top wall and providing side and end walls, said body having first and second end portions of which the second end portion is to be disposed over a burner, said side and top walls of the body providing a passage between said end portions, said top wall of the first end portion being imperforate to provide a cooking utensil, said side wall in the part thereof opposite the second end portion of the plate having an exit opening therethrough whereby the products of combustion from a burner under the second end portion must pass through the first end portion and entirely across the under surface of the imperforate top wall thereof to reach said exit opening, and said top wall of the first end portion dished to have its central portion lower than its edges whereby the products of combustion entering the first end portion will be spread to heat said wall substantially uniformly.

ALEXANDER SUSSMAN.